(12) United States Patent
Demetry et al.

(10) Patent No.: US 11,765,194 B1
(45) Date of Patent: Sep. 19, 2023

(54) RISK VIEW SHARING PLATFORM

(71) Applicant: Wells Fargo Bank, N.A., San Francisco, CA (US)

(72) Inventors: Joshua T. Demetry, Menomonee Falls, WI (US); Randy Mangelsen, San Francisco, CA (US); Jennifer Blaha, San Francisco, CA (US); Brian J. Jacobsen, Elm Grove, WI (US); Ann M. Miletti, Menomonee Falls, WI (US); Noah Wise, San Francisco, CA (US); Chris Rosato, San Francisco, CA (US); Manjunath Boraiah, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 203 days.

(21) Appl. No.: 17/146,311

(22) Filed: Jan. 11, 2021

(51) Int. Cl.
*G06F 9/451* (2018.01)
*G06Q 40/04* (2012.01)
*G06Q 40/06* (2012.01)
*H04L 9/40* (2022.01)

(52) U.S. Cl.
CPC .......... *H04L 63/1433* (2013.01); *G06F 9/451* (2018.02); *G06Q 40/04* (2013.01); *G06Q 40/06* (2013.01)

(58) Field of Classification Search
CPC ..... H04L 63/1433; G06F 9/451; G06Q 40/06; G06Q 40/04
USPC .................................................. 715/700–866
See application file for complete search history.

(56) References Cited

U.S. PATENT DOCUMENTS

| | | | |
|---|---|---|---|
| 7,249,080 B1 * | 7/2007 | Hoffman | G06Q 40/06 705/37 |
| 7,818,232 B1 * | 10/2010 | Mead | G06Q 40/06 705/36 R |
| 8,069,105 B2 | 11/2011 | Lawrence | |
| 8,793,258 B2 | 7/2014 | Asur et al. | |
| 9,170,715 B1 * | 10/2015 | Alini | G06Q 30/0627 |
| 10,290,053 B2 | 5/2019 | Priess et al. | |

(Continued)

OTHER PUBLICATIONS

Murphy, Chris B. "The Information Ratio Helps Measure Portfolio Performance." Investopedia, Investopedia, Oct. 27, 2020, www.investopedia.com/terms/i/informationratio.asp.

*Primary Examiner* — Daniel Samwel
(74) *Attorney, Agent, or Firm* — Foley & Lardner LLP (57) ABSTRACT

A risk view sharing platform system is provided. The system includes a processing circuit configured to provide a plurality of analyst applications to a plurality of analyst computing devices; receive security related data associated with a plurality of securities from the plurality of analyst applications, wherein the security related data includes security ratings and indices; integrate the security related data to generate (i) a plurality of integrated security ratings based on the security ratings and (ii) a plurality of integrated indices based on the indices; and provide a graphical user interface including the integrated security related data to a manager device that displays a plurality of tiles, wherein each tile represents a specific security from the plurality of securities and includes at least one of an integrated security rating or an integrated index of the plurality of integrated indices for the specific security.

13 Claims, 5 Drawing Sheets

(56) References Cited

U.S. PATENT DOCUMENTS

| | | | |
|---|---|---|---|
| 2002/0022988 A1* | 2/2002 | Columbus | G06Q 40/02 705/36 R |
| 2002/0032629 A1* | 3/2002 | Siegel, Jr. | G06Q 40/06 705/36 R |
| 2002/0052820 A1* | 5/2002 | Gatto | G06Q 40/00 705/36 R |
| 2002/0075302 A1* | 6/2002 | Simchik | G06F 16/9577 715/745 |
| 2003/0069821 A1 | 4/2003 | Williams | |
| 2003/0135445 A1 | 7/2003 | Herz et al. | |
| 2005/0144114 A1 | 6/2005 | Ruggieri et al. | |
| 2009/0299908 A1 | 12/2009 | Lindstrom et al. | |
| 2010/0131398 A1 | 5/2010 | Molloy et al. | |
| 2011/0145164 A1* | 6/2011 | Lavoie | G06Q 30/0282 705/347 |
| 2012/0059771 A1 | 3/2012 | Von Groll et al. | |
| 2012/0102410 A1* | 4/2012 | Gewecke | G06F 16/435 715/738 |
| 2012/0191626 A1 | 7/2012 | Ahn et al. | |
| 2012/0221485 A1 | 8/2012 | Leidner et al. | |
| 2012/0221486 A1 | 8/2012 | Leidner et al. | |
| 2012/0296694 A1 | 11/2012 | McGill et al. | |
| 2012/0310785 A1 | 12/2012 | Poulin | |
| 2013/0030975 A1 | 1/2013 | Helweg | |
| 2013/0060600 A1 | 3/2013 | Schoolman | |
| 2013/0138577 A1 | 5/2013 | Sisk | |
| 2013/0185223 A1 | 7/2013 | Duzoglou | |
| 2014/0088944 A1 | 3/2014 | Natarajan et al. | |
| 2014/0101076 A1 | 4/2014 | Martin et al. | |
| 2015/0012331 A1* | 1/2015 | Carter | G06Q 50/01 705/7.29 |
| 2016/0103917 A1 | 4/2016 | Talmor et al. | |
| 2016/0232465 A1 | 8/2016 | Kurtz et al. | |
| 2018/0350180 A1 | 12/2018 | Onischuk | |

* cited by examiner

RISK VIEW SHARING PLATFORM

TECHNICAL FIELD

The described aspects and embodiments relate to a risk view sharing platform. More particularly, the described aspects and embodiments relate to a technical data capture architecture for gathering information relating to investable vehicles and generating a graphical user interface to display the gathered information.

BACKGROUND

There are many strategies that may be considered when investing in securities (i.e., stocks, bonds, mutual funds, option contracts, exchange-traded funds or other types of investments you can buy or sell). Provider institutions, such as investment banking firms, private equity funds, hedge funds, etc. that invest in securities are often split into investment teams that may manage their own portfolios. Each investment team may include one or more portfolio managers (PMs) and one or more analysts. Generally, analysts perform market research and report findings to the PMs who then make investment decisions for the portfolio.

Each investment team may utilize different strategies when deciding how to manage their portfolios (buy, sell, hold securities, etc.). The PM(s) leading each investment team may also have his or her own personal biases that impacts the decisions. Further, each analyst may utilize different theories, strategies, and beliefs when performing market research. Each investment team is generally isolated from other investment teams within the same provider institution. For example, information about the securities, such as ratings, price targets, estimated holding periods, etc., may not be routinely shared between various investment teams even within the same provider institution. Further, each analyst may record his or her own notes on the security in a different manner such that gathering and reviewing notes on various securities from several analysts, especially across different teams, may be time consuming due to the non-uniform nature of the notes.

SUMMARY

A first example embodiment relates to a system. The system includes a network interface circuit configured to facilitate data transmission over a network, and a processing circuit including one or more processors coupled to non-transitory memory. The processing circuit is configured to provide a plurality of analyst applications to a plurality of analyst computing devices associated with a plurality of analysts, wherein each analyst application is configured to display a plurality of security related data fields; receive security related data associated with a plurality of securities from the plurality of analyst applications of the plurality of analyst computing devices via the security related data fields, wherein the security related data includes security ratings and indices; integrate the security related data to (i) generate a plurality of integrated security ratings based on the security ratings and (ii) generate a plurality of integrated indices based on the indices; and provide a graphical user interface including the integrated security related data to a manager device. The graphical user interface is configured to display a plurality of tiles. Each tile represents a specific security from the plurality of securities and includes at least one of an integrated security rating of the plurality of integrated security ratings or an integrated index of the plurality of integrated indices for the specific security.

Another example embodiment relates to a computing device. The computing device includes a network interface circuit configured to facilitate data transmission over a network, and a processing circuit including one or more processors coupled to non-transitory memory. The processing circuit is configured to: launch a graphical user interface configured to display a plurality of tiles, wherein each tile represents a specific security or industry and includes at least one of an integrated security rating or an integrated index for the specific security or industry; receive a user input selecting a specific tile on the graphical user interface; and, generate and provide a security summary window in the graphical user interface in response to receiving the user input, the security summary window displaying at least one of an integrated security rating or an integrated security sub-rating and an identity of an analyst associated with an analyst computing device that provided security-related data, wherein the security summary window is provided alongside a currently viewed research resource.

Still another example embodiment relates to a method. The method includes: providing, by a provider institution computing system, a plurality of analyst applications to a plurality of analyst computing devices associated with a plurality of analysts, wherein each analyst application is configured to display a plurality of security related data fields; receiving, by the provider institution computing system, security related data associated with a plurality of securities from the plurality of analyst computing devices, wherein the security related data includes security ratings and indices; integrating, by the provider institution computing system, the security related data from the plurality of analyst computing devices to generate a plurality of integrated security ratings based on the security ratings and a plurality of integrated indices based on the indices; generating, by the provider institution computing system, a graphical user interface configured to display a plurality of tiles, wherein each tile represents a specific security from the plurality of securities and includes at least one of the integrated security rating or the integrated index for the specific security; and providing, by the provider institution computing system, the graphical user interface to a manager computing device such that the plurality of tiles is displayed on the manager computing device.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring generally to the Figures, systems and methods for sharing security related data are disclosed according to various embodiments described herein. According to various example embodiments, a risk view sharing platform computing system captures investment information from various investment analysts across a plurality of investment teams, analyzes and integrates the captured investment information, and generates and provides a graphical user interface that displays the integrated data to a desired recipient (e.g., a manager such as a portfolio manager).

A variety of ways exist to analyze securities (e.g., equity securities, debt securities, derivative securities) and industries. Common approaches include performing a fundamental analysis and a quantitative analysis. The primary goal of a fundamental analysis (FA) is to identify or determine a true or "fair market" value of the security based on a variety of economic and financial factors (i.e., the fundamentals). For example, a fundamental analysis of a company may consider the company's industry position, growth rate, growth potential, income, revenue, and profit margins to try to determine what the fair market value of the company. A FA may also consider qualitative or immeasurable characteristics of the security, such as company culture, morale, leadership quality, etc. to determine the fair market value of the security. The fair market value determined through fundamental analysis is then compared to current offering price of the security to determine if the security is of good value. If the security is undervalued (i.e., the fair market value of the price is greater than the current trading price), an analyst using FA may consider the undervalued security a strong buy. Conversely, if the security is overvalued (i.e., the fair market value of the price is less than the current trading price, an analyst using FA may consider the overvalued FA a strong sell. When comparing one security to another, an analyst performing FA may consider the earnings per share (EPS), price to earnings ratio (P/E), projected earnings growth (PEG), free cash flow (FCF), price to book ratio (PB), return on equity (ROE), dividend payout ratio (DPR), price to sale ratio (P/S), dividend yield ration, and debt-to-equity ratio (D/E) of each security to determine which security may be a stronger buy. Typically, fundamental analyses are long-term investment strategies.

In comparison, a quantitative (quant) analysis relies on mathematical and statistical modeling to analyze past, current, and anticipated behavior of the security. Quant analyses include performing a technical analysis to focus on the recent performance of a security to predict future performance of the security. A technical analysis includes examining the patterns within, for example, stock charts to forecast future pricing and volume trends. A technical analysis assumes that future patterns and movements will be similar to previous patterns and movement. A quant analysis may further incorporate statistical and economic variables including valuation ratios, risk ratings, and trading behaviors of a security, though the possibilities of further metrics to consider is nearly endless. For example, an analyst performing a quant analysis may consider a number of benchmark ratios such as the beta (i.e. the systematic risk of the security compared to a similar index), the correlation (i.e., how the security performs compared to another security), and the alpha (i.e., the difference in returns relative to the amount of risk taken).

Fundamental analysis and quantitative analysis are two examples of different types of analyses that may be used by analysts. However, one form of analysis is not necessarily better at predicting the performance of a security than the other type of analysis. Further, multiple analysts performing the same type of analysis (e.g., fundamental analysis) may come to different conclusions about which securities to invest in (i.e., have the highest rating).

Investment teams within a provider institution are typically managed by a PM that focuses on a specific type of analysis (e.g., fundamental, quantitative, etc.). The PM may also instruct the analysts on his or her investment team to focus on a specific type of analysis. For example, the PM may have a personal bias that leads the PM to believe one method of investing is better than the other. However, ignoring either fundamental analysis or quantitative analysis may expose the investment team to unnecessary risk. For example, a security may be highly rated using a quantitative analysis (e.g., high earnings, high earnings forecasts, promising chart pattern, etc.) and poorly rated using a fundamental analysis (e.g., poor asset management, poor interest rate on debt owed, poor growth potential, etc.).

According to the present disclosure, the risk view sharing platform computing system allows security related data (e.g., research resources, security recommendations, security ratings, risk indices, and other opinions or information of or regarding the security) from several analysts to be integrated and provided in a graphical user interface to a PM such that the PM may readily view and interact with the integrated data. The graphical user interface may include a plurality of tiles (e.g., box, icon, graphical indicator, etc.) where each tile is associated with a particular security. The tiles may include indicators regarding the research, such as a risk index. Multiple risk indices from multiple teams may be depicted in each tile (or, one index or rating per one tile). Based on acquiring analyst research via a dedicated application or portal, the analyst(s) associated with the research is able to be tracked. In this way, the tiles on the graphical user interface are interactive such that the PM (or other operator) may click or otherwise select a tile to readily engage with the analyst or team associated with the depicted research. Beneficially, the graphical user interface integrates security related data across multiple teams to aid the PM's consumption of said data. A technical field may include graphical user interfaces, and the present disclosure improves upon graphical user interfaces by providing communicable coupling from one interface to multiple devices in a secure way to enable an operator to selectively drill down on depicted information, and communicate with person(s) responsible for the information in a seamless and efficient manner.

Figure 1:
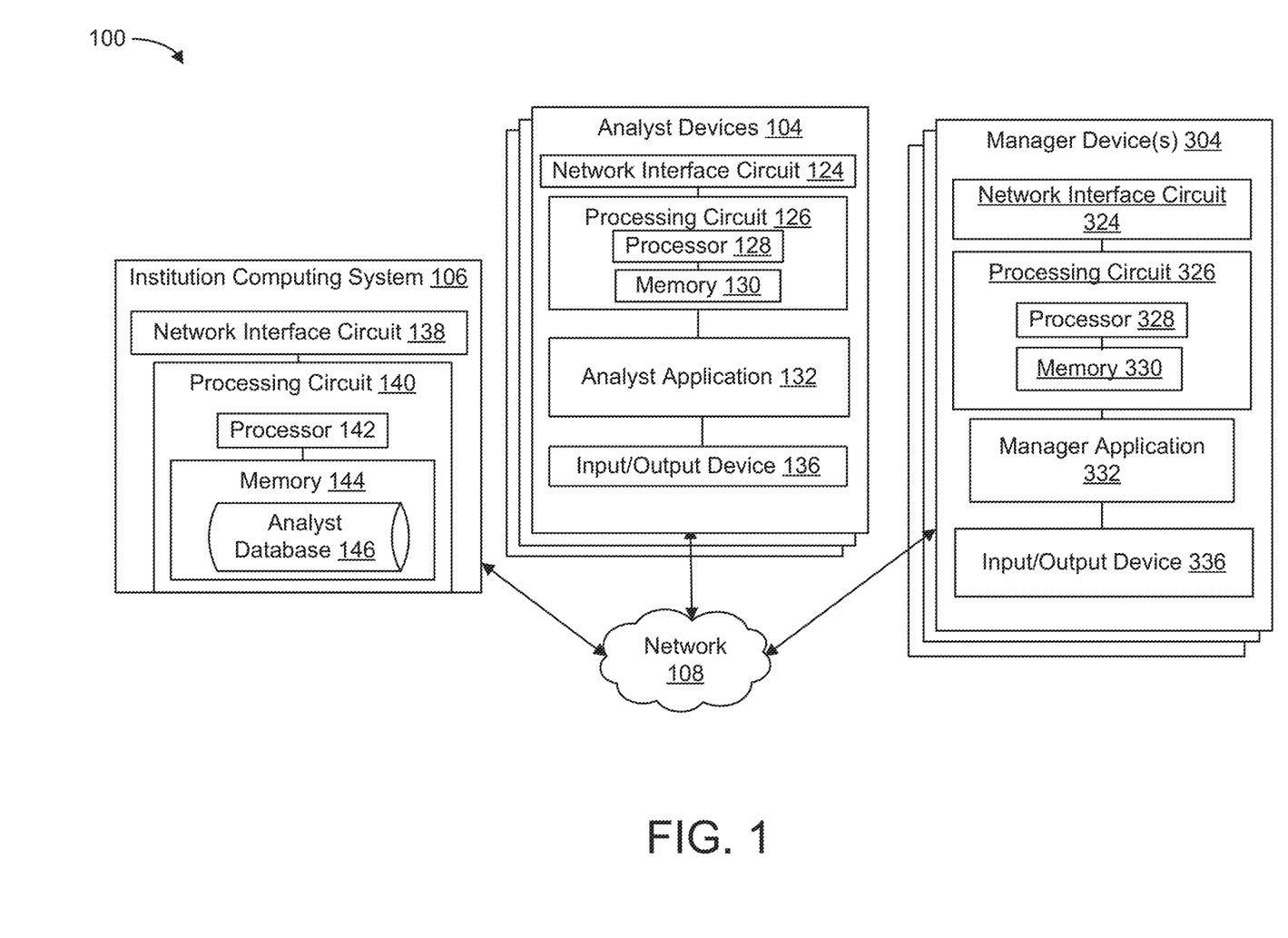
FIG. 1 is a block diagram of a risk sharing platform computing system, according to an example embodiment.

Referring now to FIG. 1, a block diagram of a risk view sharing platform computing system 100 is shown, according to an example embodiment. As will be described in further detail below, the risk view sharing platform computing system 100 can provide analysts (e.g., investment analysts, PMs, general managers, etc.) with the ability to receive investment related security related data from analysts from multiple investment teams, integrate the received security related data, and provide a graphical user interface that interactively provides the integrated security related data. As used herein, "security related data" refers to any type of information related to a security including, but not limited to, research resources, security recommendations, security ratings, risk indices, and so on. Technically, the present system couples two or more analyst computing devices to provide a real-time or near real time interactive security related data communications platform. The present system tracks the security related data from multiple analysts across various investment teams and leverages the insight gained from the multiple analysts to provide an interactive graphical user interface that includes integrated security related data for several securities. The interactive graphical user interface may display integrated ratings for multiple securities such that the portfolio manager (or another operator) can sort and filter the integrated ratings for further analysis. Further, the graphical user interface may enable the portfolio manager to interact with the analysts that provided security related data. Thus, the various aspects and embodiments described herein provide a technical improvement in analyst data collection and integration.

As shown, the risk view sharing platform computing system 100 includes one or more analyst devices 104, one or more manager devices 304, and a provider institution computing system 106. The one or more analyst devices 104, the one or more manager devices 304, and the provider institution computing system 106 are shown to be communicatively and operatively coupled to each other via a network 108. The network 108 provides communicable coupling to provide and facilitate the exchange of communications (e.g., security related data). The network 108 may be or include one or more of a local area network, a wide area, a wired network, and/or a combination of wireless and wired networks. Examples of network configurations include the Internet, a cellular network, Wi-Fi, Wi-Max, a proprietary banking network, etc. In some embodiments, the network 108 includes a proprietary banking network to provide secure or substantially secure communications.

The analyst device 104 is a computing device owned by, operated by, or otherwise associated with an analyst. An analyst is a person that performs investment research. In this regard, the analyst device 104 may enable performance of any type of security investment research, including, but not limited to fundamental investing, quantitative investing, technical investing, value based investing, growth based investing, swing investing, momentum investing, dollar-cost investing, income based investing, small cap investing, and any combination of these investment strategies.

As shown, the system 100 includes a plurality of analyst devices 104 associated with a plurality of analysts. The analysts may be a part of a variety of investment teams (e.g., a first analyst device 104 is associated with a first investment team and a second analyst device 104 is associated with a second investment team). In certain embodiments, the first investment team is focused on fundamental investment strategies while the second investment team is focused quantitative investment strategies. The first analyst associated with the analyst device 104 and the first investment team and the second analyst associated with the second investment team and another analyst device 104 team may be analysts within the same provider institution. In certain embodiments, the first investment team and the second investment team are isolated from one another. That is, except as described otherwise herein, the first and second investment teams are not in direct communication with each other, do not directly share research with one another, and do not work together to develop investment plans.

The analyst device 104 can be any type of computing device that may be used to access, research, develop, and/or modify security related data. For example, the analyst may utilize the analyst device 104 to access investment information that is stored and/or otherwise managed by the provider institution computing system 106. The analyst device 104 may include or be any wearable or non-wearable computing device. Wearable computing devices refer to any type of device that an individual wears including, but not limited to, a watch (e.g., a smart watch), glasses (e.g., eye glasses, sunglasses, smart glasses, etc.), bracelet (e.g., a smart bracelet), etc. The analyst device 104 may also include any type of computing device including, but not limited to, a phone (e.g., smart phone), a tablet, a laptop, a desktop computer, a personal digital assistant, etc.

As shown, there may be a plurality of analyst devices 104. The analyst devices 104 may be the same computing devices (e.g., the first investment team analyst device 104 is a tablet and the second investment team analyst device 104 is a tablet). Alternatively, the analyst devices 104 may be different from each other (e.g., the first investment team analyst device 104 is a phone and the second investment team analyst device 104 is a laptop).

The analyst device 104 includes a network interface circuit 124 configured to enable the analyst device 104 to exchange information over the network 108, a processing circuit 126, and an input/output (I/O) device 136. The network interface circuit 124 can include program logic that facilitates connection of the analyst device 104 to the network 108. The network interface circuit 124 supports communications between the analyst device 104 and other systems, such as the provider institution computing system 106. For example, the network interface circuit 124 can include a cellular modem, a Bluetooth transceiver, a radio-frequency identification (RFID) transceiver, and a near-field communication (NFC) transmitter. In some embodiments, the network interface circuit 124 includes the hardware and machine-readable media sufficient to support communication over multiple channels of data communication. Further, in some embodiments, the network interface circuit 124 includes cryptography capabilities to establish a secure or relatively secure communication session between the analyst device 104 and the provider institution computing system 106. In this regard, security related data may be encrypted and transmitted to prevent or substantially prevent a threat of hacking.

The processing circuit 126 is shown to include a processor 128 and a memory 130. The processor 128 may be implemented as one or more application specific integrated circuits (ASICs), field programmable gate arrays (FPGAs), a group of processing components, or other suitable electronic processing components. The memory 130 may be one or more devices (e.g., RAM, ROM, Flash memory, hard disk storage) for storing data (e.g., security related data) and/or computer code for completing and/or facilitating the various processes described herein. The memory 130 may be or include non-transient volatile memory, non-volatile memory, and non-transitory computer storage media. The memory 130 may include database components, object code components, script components, or any other type of information structure for supporting the various activities and information structures described herein. The memory 130 may be communicably coupled to the processor 128 and include computer code or instructions for executing one or more processes described herein.

The analyst device 104 may include an analyst application 132. In the example shown, the analyst application 132 may be provided and supported by the provider institution computing system 106. In some embodiments, the analyst application 132 is configured to generate and provide displays for presentation/display by the analyst device 104 (e.g., to the I/O device 136 described below) that enable the analyst to view and/or manage integrated data received from the provider institution computing system 106 and, in particular, utilize the risk view sharing platform computing system 100. For example, the analyst application 132 may include/generate a graphical user interface (GUI) that enables the analyst to interact with the analyst application 132 as discussed further below with respect to FIG. 3. Accordingly, the analyst application 132 is configured to send information (e.g., security related data) to, and receive information from, the provider institution computing system 106.

The analyst application 132 is as an application on the analyst device 104. The analyst application 132 may be downloaded by the analyst device 104 prior to its usage, hard coded into the memory 130 of the analyst device 104, or be a network-based or web-based interface application such that the analyst device 104 may provide a web browser to access the application, which may be executed remotely from the analyst device 104. Accordingly, the analyst device 104 may include software and/or hardware capable of implementing a network-based or web-based application. For example, in some instances, the analyst application 132 includes software such as HTML, XML, WML, SGML, PHP (Hypertext Preprocessor), CGI, and like languages.

In some embodiments, the analyst interacts with the analyst application 132 via an I/O device 136. The I/O device 136 can include hardware and associated logics that enable the analyst to exchange information with the analyst device 104. An input component of the I/O device 136 can allow the analyst to provide information to the analyst device 104. The input component may include various hardware and associated logics such as, for example, a mechanical keyboard, a mechanical mouse, a touchscreen, a microphone, a camera, a fingerprint scanner, etc. Likewise, an output component of I/O device 136 can include hardware and associated logics that allow the analyst device 104 to provide information to the analyst. For example, the output component may include a digital or touchscreen display, a speaker, illuminating icons, LEDs, etc. In this way, the analyst can interact with the analyst application 132. For example, the analyst may provide login information (e.g., analyst name, password, etc.) by typing on a mechanical keyboard or touchscreen keyboard included in the I/O device 136 and be provided account information on a digital display component of the I/O device 136.

As shown in FIG. 1, the risk view sharing platform computing system 100 also includes one or more manager devices 304. Each manager device 304 is configured to receive security related data from the analyst devices 104 and the provider institution computing system 106. Each manager device 304 may be operated by a portfolio manager or another manager-type person or group. For example, the manager device 304 may be operated by a portfolio manager that manages a group of analysts operating the analyst devices 104. In this example, the manager device 304 may receive security related data from the analyst devices 104 via the network 108. Alternatively, the portfolio manager may be completely isolated (e.g., on a different investment team) than the first group of analysts and/or the second group of analysts. In this example, the security related data may be provided by the analyst devices 104 to the provider institution computing system 106 via the network. The provider institution computing system 106 may then provide the security related data to the manager device 304 via the network 108.

The manager device 304 may be similar or the same as the analyst device 104. For example, the manager device 304 includes a network interface circuit 324 configured to enable the manager device 304 to exchange information (e.g., security related data) over the network 108. The manager device 304 is shown to include a processing circuit 326 that includes a processor 328 and a memory 330. The processing circuit 326 may be the same or similar to the processing circuit 126. Further, the processor 328 and the memory 330 may be similar to the processor 128 and the memory 130, respectively. The manager device 304 may include an I/O device 336 that is similar to the I/O device 136. Thus, different reference numbers are used with the manager device 304 for clarity, but it should be appreciated that the manager device 304 may have the same or similar structure as the analyst device 104. In other embodiments, the structure of the manager device 304 may differ from the analyst devices 104.

The manager device 304 includes a manager application 332. The manager application 332 may be provided by and at least partially supported by the provider institution computing system 106. The manager application 332 may be configured to receive security related data or other information from the analyst devices 104 and the provider institution computing system 106. Further, the security related data from the analyst applications 132 may be provided to the provider institution computing system 106 where the security related data may be analyzed, summarized, and integrated with other security-related data. Further, the security related data may be selectively anonymized, and provided to the manager application 332. The manager application 332 is configured to selectively receive security related data associated with the analyst applications 132 and/or receive integrated data from the provider institution computing system 106. In some embodiments, the manager application 332 is configured to generate and provide displays for presentation/display by the manager device 304 (e.g., to the I/O device 136 described above) that enable the manager to view and/or manage integrated security related data received from the provider institution computing system 106 and, in particular, utilize the risk view sharing platform computing system 100. For example, the manager application 332 may include/generate a graphical user interface (GUI) that enables the manager to interact with the manager application 332 on the manager device 304 as discussed further below with respect to FIGS. 4 and 5. Accordingly, the manager application 332 is configured to send information to, and receive security related data from the provider institution computing system 106.

As shown in FIG. 1, the risk view sharing platform computing system 100 includes a provider institution computing system 106. The provider institution computing system 106 is a backend computer system that couples to the analyst device 104 and the manager device 304 via, particularly in one embodiment, the analyst application and the manager application, respectively. The provider institution computing system 106 is configured to receive security related data from the analyst devices 104, analyze the received security related data, generate integrated security related data, and provide the generated integrated security related data to the manager device(s) 304. The provider institution computing system 106 is associated with a provider institution. The provider institution may be a financial institution such as a bank, an investment banking firm, private equity fund, hedge fund, credit union, credit card company, and so on. The provider institution computing system 106 includes a network interface circuit 138 and a processing circuit 140. The network interface circuit 138 includes program logic that facilitates connection of the provider institution computing system 106 to other components of the risk view sharing platform computing system 100 over the network 108.

The processing circuit 140 includes a processor 142 and a memory 144. As shown in FIG. 1, the memory 144 includes an analyst database 146. In other embodiments, the analyst database 146 may be separate from the memory. The analyst database 146 is configured to retrievably store security related data from the analyst devices 104. In this regard, the analyst database 146 is configured to store data associated with and from each analyst device 104. The analyst information stored therein may be generated internally (e.g., at the provider institution computing system 106) or by other entities (e.g., at the analyst device(s) 104). Alternatively or additionally, the processing circuit 140 may provide certain information to an analyst device 104 or manager device 304, such that the analyst device 104 and/or manager devices 304 may store the information internally within the device. The provider institution computing system 106 may further transform the security related data stored in the analyst database 146. For example, the provider institution computing system 106 may receive security related data from a plurality of analyst devices (e.g., the analyst devices 104), analyze the data received, generate integrated security related data, and provide the generated integrated security related data to the manager device 304. The transformation converts the received security related data into a uniform type such that it can be combined with other similar data and make it easily searchable within the database.

The network interface circuit 138 includes program logic that facilitates coupling and connection of the provider institution computing system 106 to the network 108. The network interface circuit 138 can support communication between the other systems, such as the analyst devices 104 and the manager devices 304. For example, the network interface circuit 138 can include a cellular modem, a Bluetooth transceiver, a radio-frequency identification (RFID) transceiver, and a near-field communication (NFC) transmitter. In some embodiments, the network interface circuit 138 includes the hardware and machine-readable media sufficient to support communication over multiple channels of data communication. Further, in some embodiments, the network interface circuit 138 includes cryptography capabilities to establish a secure or relatively secure communication session between other systems such as the analyst devices 104 and the manager devices 304. In this regard, information (e.g., account information, login information, and security related data) may be encrypted and transmitted to prevent or substantially prevent a threat of hacking.

The processor 142 may be implemented as one or more application-specific integrated circuits (ASICs), field-programmable gate arrays (FPGAs), a group of processing components, or other suitable electronic processing components. The memory 144 may be one or more devices (e.g., RAM, ROM, Flash memory, hard disk storage) for storing data and/or computer code for completing and/or facilitating the various processes described herein. The memory 144 may be or include non-transient volatile memory, non-volatile memory, and non-transitory computer storage media. The memory 144 may include database components, object code components, script components, or any other type of information structure for supporting the various activities and information structures described herein. The memory 144 may be communicably coupled to the processor 142 and include computer code or instructions for executing one or more processes described herein. In some embodiments, the provider institution computing system 106 is a distributed computing system and includes one or more servers. In this case, provider institution computing system 106 may include multiple network interface circuits 138 and/or multiple processing circuits 140.

Figure 2:
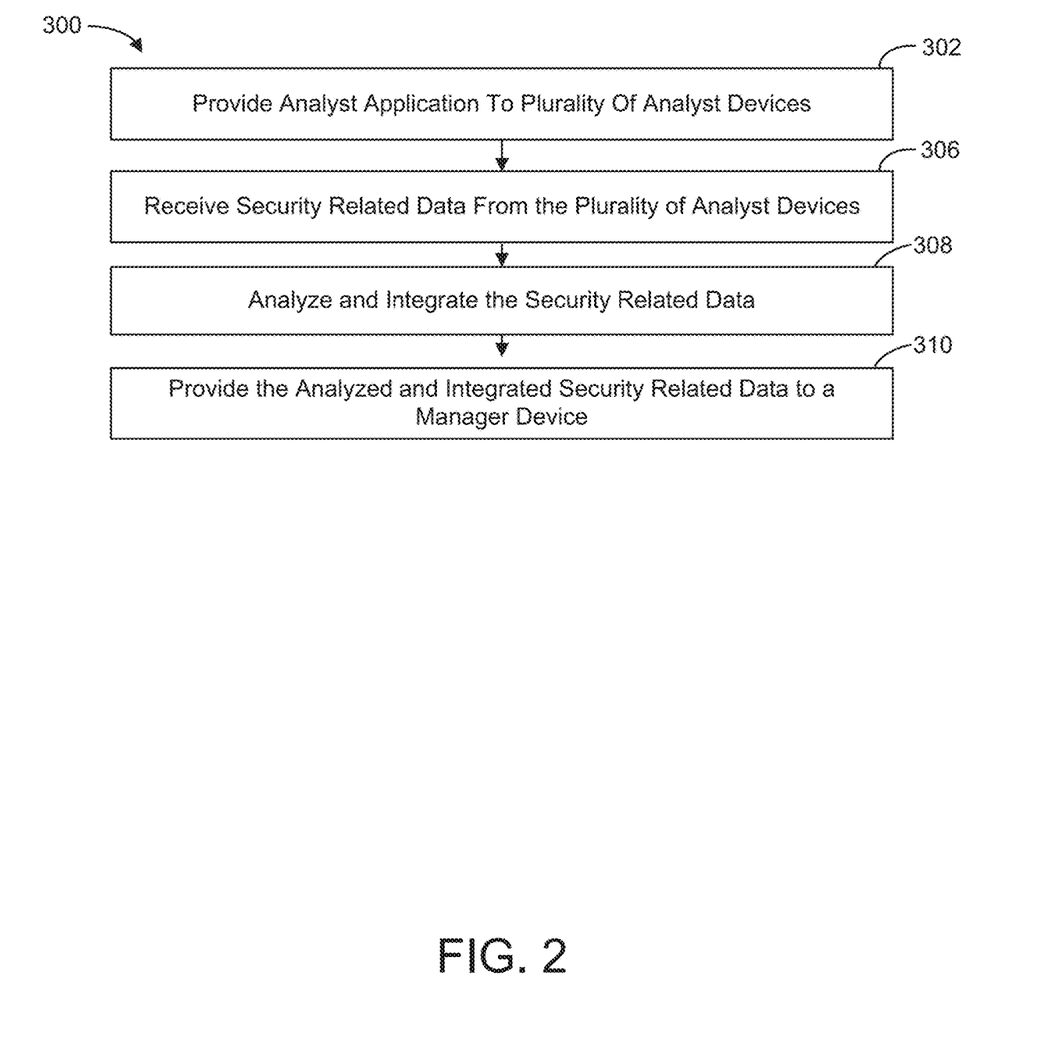
FIG. 2 is a flow diagram of security-related data capturing and sharing method, according to an example embodiment

Referring now to FIG. 2, a flow diagram of security-related data capturing and sharing method is shown, according to an example embodiment. It should be appreciated that the processes need not be performed in the order displayed in FIG. 2. Further, certain processes may be omitted and additional processes may be performed in addition to the processes shown in FIG. 2. The process 300 may be implemented using, for example, the risk view sharing platform computing system 100. Accordingly, reference is made to the risk view sharing platform computing system 100 to aid explanation of the process 300.

At process 302, an analyst application 132 is provided to a plurality of analyst devices 104. The analyst application 132 is configured to generate GUIs for display on the analyst device 104. In an alternate embodiment, such as when the analyst application 132 is a web based application, the GUI may be generated by the provider institution computing system 106 and is accessible via a web browser on the analyst device 104. The alternate embodiment recognizes that the analyst application may be provided a web-based application. In either situation, a GUI of the application 132 is configured to present a plurality of security related data fields (e.g., boxes, fillable areas, etc.) to an operator of the analyst device 104. The security related data fields may include security rating fields, security sub-rating fields, security recommendation fields, and/or risk index fields. As used herein, a security rating refers to an overall relative rating assigned to a specific security based on how the analyst believes the security will perform in the future (e.g., over a predefined upcoming period of time). For example, if the analyst believes a security will perform well in the future, the analyst may assign the security a positive analyst security rating (e.g., 8 out of 10 on a scale from, e.g., 1-10 wherein 10 is the highest possible rating for a security). A security sub-rating refers to a relative rating assigned to a specific security that rates/values/rates various aspects of the security (e.g., valuation rating, profitability rating, etc.). For example, if the analyst believes a security will grow at a high rate in the future, the analyst may assign the security a positive security sub-rating (i.e., a growth rating). A security recommendation refers to an indication of whether the analyst believes the security should be bought, sold, or held. A risk index is an indicator or measure of risk and refers to a measure of change in a security based on circumstances surrounding the security. For example, a risk index predicts a volatility of a security in relation to the overall market, a specific sector, etc. The risk indices may include, but are not limited to, market risk, business risk, credit risk, liquidity risk, regulatory risk, and other risk characterizations that may be used with a security or industry. In further embodiments, the analyst application 132 GUI may include an anonymization request field. The anonymization request field refers to a provided field that the analyst may utilize to conceal the analyst's identity when providing security related data from the analyst device 104 to the provider institution computing system 106 (or directly to the manager device). In certain embodiments, the analyst may provide an affirmative "opt-in" indication via the analyst application to share information with the provider institution computing system. In some embodiments, the analyst may also define what is and what is not shared with the provider institution computing system 106 via the analyst application 132.

At process 306, security related data is received from a plurality of analyst devices. The security related data may be used to make investment related decisions regarding the researched securities. The security related data is received by the provider institution computing system 106. As discussed above, the security related data may include an overall rating assigned to a specific security by the analyst (i.e., a security rating), various sub-ratings (e.g., growth rating, profitability rating, etc.), one or more risk indices, and/or one or more security recommendations. The security related data may also include other information about the security, such as the sector the security is involved in, current price of the security, target price of the security, etc.

Process 306 may further include receiving an anonymization request from the analyst device. For example, certain analysts may not want to be identified, or feel that they are able to submit more candid security related data if the security related data is not tied directly to them. It should be appreciated that in certain embodiments, the ability to anonymize the security related data may be restricted to certain analysts or barred all together. Alternatively, the analyst application 132 may anonymize the security related data before providing the security related data to the provider institution computing system 106, as is discussed further below with respect to FIG. 3.

Alternatively, the security related data may include an indication of the analyst device 104 that provided the security related data. The provider institution computing system 106 may then determine an identity of the analyst associated with the analyst device 104 that submitted the security related data. For example, the analyst application 132 may generate or be assigned an analyst application identifier (e.g., a specific value) such that data received from that application also is assigned to that identifier. In the provider institution computing system 106 database, a table may be stored that links or otherwise associates the application identifier for each provided analyst application to a specific analyst. Thus, the provider institution computing system 106 may then correlate the received application identifier to the stored identifiers to identify the analyst in the database. As an example, during registration of the application 132 on the analyst device, the provider institution computing system may receive an indication of a successful authorization/download to the analyst device (or manager device). During the registration process, information regarding the analyst device (e.g., phone number, device identifier, etc.) may be used to uniquely identify the device and analyst associated with the device and application. Further and during registration of the analyst application 132, the provider institution computing system 106 may generate an analyst application identifier (e.g., a unique string of characters and/or values) and assign it to the newly registered analyst application 132. The analyst application 132 may then store this value locally while a duplicate is stored in the provider institution computing system database. Subsequently, when security related data is transmitted from the application 132 to the provider computing system 106, the provider computing system may utilize the identifier to determine an identity of the analyst. In other embodiments, a specific input from the analyst (e.g., name, email address, etc.) may be used. In either situation, based on the determined identity of the analyst, the provider institution computing system 106 may determine that the analyst is a member of a particular investment team (e.g., this information may also be stored in the database of the provider institution computing system) and other stored specifics of the analyst.

The security related data may identify resources utilized by the analyst in performing research on the security. As utilized herein, a "resource" or "research resource" refers to the material utilized by an analyst to research a security. Example resources include, but are not limited to, an online article, blog post, financial chart, an email, a phone call, etc. In certain embodiments, the analyst application 132 may include tracking software that tracks what resources are accessed using the analyst device 104 (e.g., via natural language processing of phone calls, via optical character recognition of printed materials, and so on). In this example embodiment, the analyst application 132 may automatically track the research resources accessed and include the tracked resources in the security related data provided by the analyst device 104. Further, in certain embodiments, the analyst may use the graphical user interface of the analyst application 132 to identify and/or attach resources that were accessed. Identifying the resources in the security related data may provide the portfolio manager insight into the analyst's decision making process. The tracked resources may be provided to the provider institution computing system from the analyst application 132.

At process 308, the security related data received from the plurality of analyst devices 104 is analyzed and integrated. The provider institution computing system 106 receives the security related data from each analyst device, analyzes the security related data, and integrates the security related data. The provider institution computing system 106 combines the security related data to generate "integrated security related data." The "integrated security related data" refers to the combined or aggregated security related data received from one or more analyst applications. The integrated security related data includes integrated security ratings, integrated security sub-ratings, and integrated risk indices. The integrated security related data may provide insight into the predicted performance of the security and to identify risks associated with the security. As used herein, an integrated security rating is a rating for a specific security that is generated based on one or more security ratings received from one or more analyst applications 132 deployed to one or more analyst devices 104. As also used herein, an integrated security sub-rating is a sub-rating for a specific security that is generated based on one or more security sub-ratings received from one or more analyst applications 132 deployed to one or more analyst devices 104. As further used herein, an integrated risk index is a risk index for a specific security that is generated based on one or more risk indices received from one or more analyst applications 132 deployed to one or more analyst devices 104. In this regard, if only one rating, sub-rating, or index is received, this value is the "integrated" rating. In other situations, multiple values are combined to form a true "integrated" rating, sub-rating, and/or index.

Process 308 includes integrating security-related data received from multiple analyst devices 104 by the provider institution computing system 160. The multiple analyst devices may be associated with a plurality of investment teams, such as, in this example, a first investment team and a second investment team. In this example, process 308 includes integrating the security related data from the first investment team to produce an integrated security rating for the first investment team. For example, if multiple analysts on the first analyst team submit security related data on the same security (e.g., multiple analysts submit a CEO sub-rating for a publically traded company), the provider institution computing system 106 may integrate each analyst's sub-rating to produce an integrated sub-rating for that security. In some embodiments, the integrated ratings for each team may be integrated with integrated ratings with other teams. In this way, an overall integrated rating across multiple teams may be formed/created.

Generating the integrated ratings, sub-ratings, and indices may be performed in a variety of different ways. The provider institution computing system 160 may utilize one or more algorithms or processes to value the received security related data to generate the integrated ratings, sub-ratings, and/or indices. For example, weights may be applied to each security sub-rating that depend on the industry that the security is related to. In this regard, a growth potential sub-rating for a security involved in the technology industry may be weighted more heavily than a profitability rating for that security.

Based on the foregoing, a sample integrated security related data algorithm is provided below. In this sample algorithm, $R_{integrated}$ is an integrated security rating for a specific security based on the security ratings (i.e., security related data) from first and second analysts. In the formula below, $S_1$ is a security rating assigned to the security by the first analyst, $S_2$ is a security rating assigned to the security by the second analyst, $C_1$ is a weight given to the first security rating, and $C_2$ is a weight given to the second security rating. The weights may be pre-determined values based on the type of security and the characteristics of that security (or other factors). It should be appreciated that while the algorithm below only includes security ratings from two analysts, in other embodiments, the algorithm may only include a single security rating or may include more than two security ratings. Further, it should be appreciated that a similar algorithm may be implemented to generate integrated sub-ratings and integrated risk indices. In this regard, similar sub-ratings (e.g., growth ratings for a particular security) and indexes may be combined in a similar way.

$$R_{integrated} = C_1 S_1 + C_2 S_2$$

At process 310, the integrated security related data is provided to the manager device 304 (or another recipient). In certain embodiments, a graphical user interface (GUI) including the integrated security related data is generated as part of process 310. The GUI may be generated by the provider institution computing system 106 and/or the manager device 304. For example, the integrated security related data may be provided to the manager device 304 and the manager application 332 may generate the GUI. Alternatively, in certain embodiments, such as when the manager application 332 is a web based application, the provider institution computing system 106 may generate the GUI and provide the GUI to the manager application 332 for display on the manager device 304 (e.g., via a web browser that accesses the manager application 332 on the web). The generated GUI provides an interactive display that enables a user (e.g., the portfolio manager operating the manager device 304) to gain insight into a plurality of securities and/or sectors based on the security related data received from the plurality of analyst devices 104. In this regard, the PM may be able to make more informed decisions regarding how to manage securities than via conventional means. In certain embodiments, the provider institution computing system 106 may continually update the integrated security related data in real-time or near real time as more security related data is received from analyst devices 104. In this sense, the GUI may be updated to provide a nearly up to date insight and risk warning for a specific security or sector.

Figure 3:
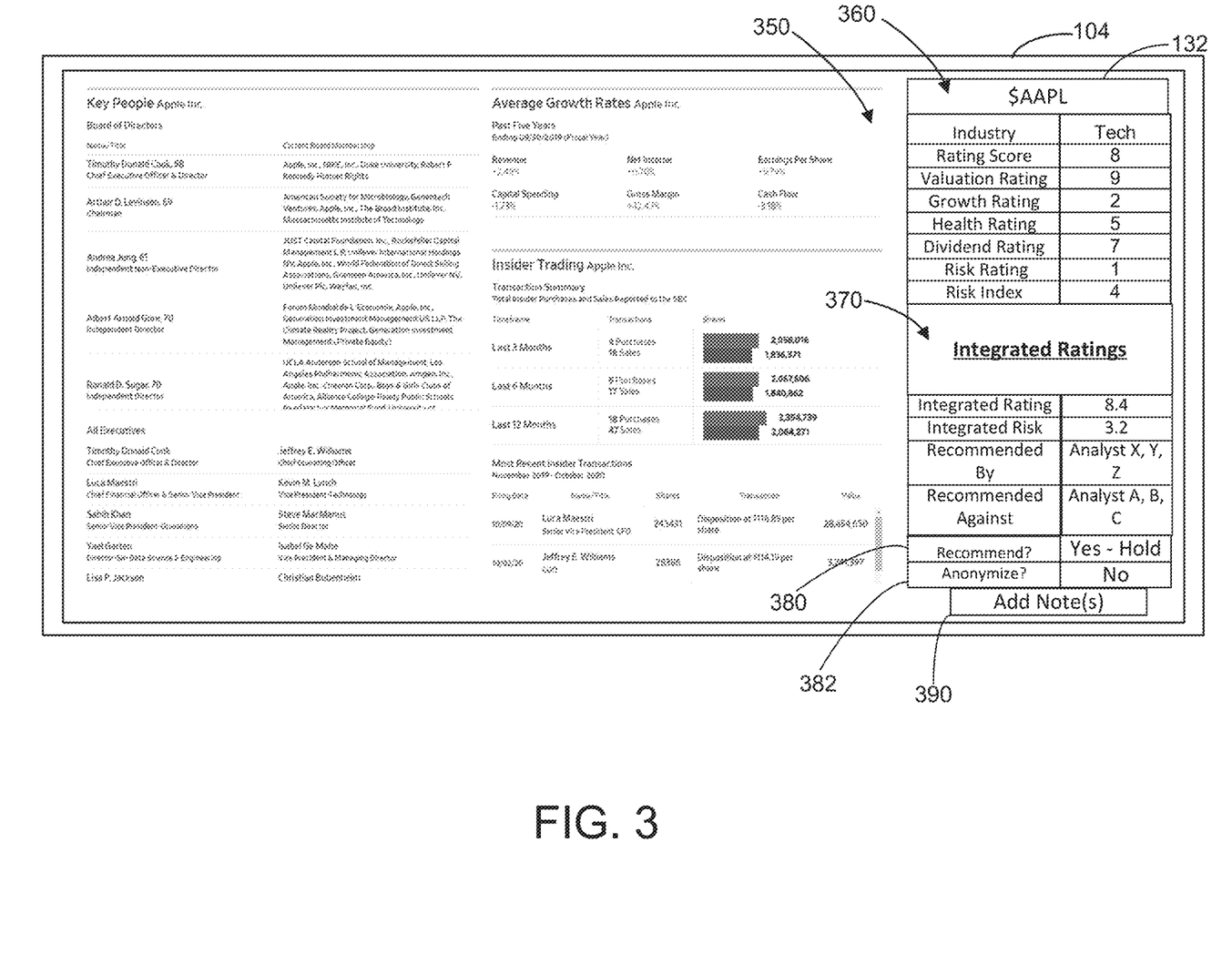
FIG. 3 is a display screen of an analyst device showing a graphical user interface for engaging with the risk view sharing platform, according to an example embodiment.

Referring now to FIG. 3, a display screen of an analyst device 104 is shown according to an example embodiment. As shown, the display screen includes a GUI 350 generated by the analyst application 132. The analyst device 104, the analyst application 132, and the corresponding GUI 350 may be utilized as a part of process 300 described above (e.g., the GUI 350 may be provided to the analyst device 104 at process 302 and used to submit security related data as a part of process 306). As shown, the analyst application 132 generates a GUI 350 provided on the same display screen as an accessed research resource, which in this example, is shown as an online article regarding a security. It should be appreciated that each individual analyst device 104 may implement a similar GUI 350 as a part of the analyst application 132.

As alluded to above, the research resource may include, but is not limited to, charts, articles, PDFs, emails, word processing documents, etc. Only a portion of the research resource is shown in FIG. 3. For example, the analyst may scroll up or down on the first analyst device 104 to view more information embedded within the research resource. The research resource in this example is shown alongside the GUI 350. In certain embodiments, the analyst application 132 may activate the application 132 that generates the GUI 350 is in response to determining that the analyst device 104 is interacting with the resource. For example, the analyst application 132 may implement natural language processing that enables the analyst application 132 to determine that security related data is being viewed on the analyst device 104.

The analyst application 132 generates a GUI 350 that is displayed on the display screen of the first analyst device 104. In other embodiments, the GUI 350 may be provided on a separate screen from the research resource. Beneficially, in the example shown, the analyst application 132 utilizes an API or SDK to integrate with a web-browser on the device 104 to enable the GUI 350 to be generated and provided alongside online web browsing research. Further, in some embodiments, the analyst application 132 may operate in the background such that the analyst application 132 is not visible on the display screen of the first analyst device 104 when the web browsing is performed. The analyst application 132 is configured to track the activity on the first analyst device 104. The analyst application 132 may be configured to receive security related data via the GUI 350.

As shown, the GUI 350 of the analyst application 132 includes a plurality of security related data fields 360. The security related data fields 360 may be utilized to capture security related data and other information related to a specific security or sector. As shown, the security related data fields 360 includes an identification field that identifies the security (e.g., $AAPL) that the analyst is research. The security related data fields 360 includes an industry identification field that identifies the industry or sector that the specific security is related to (e.g., tech), a security rating field (e.g., "rating"), a plurality of security sub-rating fields (e.g., a "valuation rating" field, a "growth rating" field, a "health rating" field, a "dividend rating" field, and a "risk rating" field), and a plurality of index fields (e.g., alpha, beta, risk indices, etc.). Further as shown, the security related data fields 360 also include a general recommendation field. In certain embodiments, some or all of the information shown in the security related data fields 360 is provided by an analyst that interacts the GUI 350 on the analyst device 104. It should be appreciated that these fields are meant to be illustrative and should not be interpreted as limiting. The information that is collected as a part of completing the security related data fields 260 may be provided to the provider institution computing system 106 as a part of process 300 described above.

In certain embodiments, some of the security related data fields 360 (e.g., a security rating field, security sub-rating fields, security recommendations, and risk indices) are automatically populated by the analyst application 132. For example, the analyst application 132 may access information embedded within the research resource that is being viewed on the first analyst device 104. For example, the analyst application 132 may implement natural language processing that enables the analyst application 132 to determine that security related data is provided within the research resource. The analyst application 132 may then retrieve the security related data and provide the security related data to the provider institution computing system 106. Further, the analyst application 132 may access and retrieve security related data from research resources that are not being viewed on the first analyst device 104. For example, if the analyst is viewing a Wall Street Journal article on the analyst device 104, the analyst application 132 may access a Yahoo! Finance and retrieve security related data from this resource to populate the security related data fields 360. The security related data fields 260 may then be displayed on the first analyst device 104 while the analyst is viewing the Wall Street Journal article.

As shown, the GUI 350 of the analyst application 132 also includes integrated ratings fields 370. The integrated rating fields 370 may include some or all of the integrated security related data generated at process 308. For example, the GUI 350 may include an "integrated rating" and an "integrated risk index" field that are determined by analyzing the security related data received, as discussed above. Further, the integrated rating fields 370 may include a "recommended by" field that indicates which analyst recommended the security and what the analyst's recommendation was (e.g., buy, sell, or hold). In certain embodiments, the integrated ratings fields 370 may be concealed from the analyst using the analyst device 104 (i.e., not presented on the GUI 350) until after the analyst has submitted security related data for the security to avoid any biases. In some embodiments, some or all of the integrated ratings fields may be concealed from the analyst such that they are only provided on the manager application 332.

As shown, the GUI 350 of the analyst application 132 also includes a security recommendation field 380. The "security recommendation" field refers to an area for the analyst to indicate whether the security is recommended as being bought, sold, or held. For example, if the analyst is a member of the fundamental analysis investment team and believes the security described in the investment resource has a fair market value higher than the current price, the analyst may select the "yes" field on the GUI 350 of the analyst application. In certain embodiments, this response is provided to the provider institution computing system 106 as a part of process 306 described above. Further, upon providing a security recommendation, a notification may be provided to the manager device 304 to alert the manager that the analyst recommends the security. It should be appreciated that these fields are meant to be illustrative and should not be interpreted as limiting. Further, in certain embodiments, the GUI 350 may not include a security recommendation field.

As shown, the GUI 350 of the analyst application 132 also includes an "add note" field 390. The "add note" field may be selected by the analyst on the GUI 350 of the analyst application 132 to enable the analyst to identify or attach resources that were used and/or include further notes on the security. The analyst may attach any type of note, such written text and attachable files (e.g., PDF, word processing documents, etc.). It should be appreciated that in certain embodiments, the GUI 350 may not include an "add note" field. In certain embodiments, these notes are provided to the provider institution computing system 106 as a part of process 306 described above. Further, these notes may be provided to the manager device 304. In certain embodiments, this response is provided to the provider institution computing system 106 as a part of process 306 described above.

The data provided from the first analyst device 104 to the provider institution computing system 106 at process 306 may include an indication of the origin of the security related data. For example, in certain embodiments, the security related data may include an analyst identifier that uniquely identifies the analyst device 104 and/or the respective analyst. In one embodiment, the analyst identifier is a unique value as described above. In another embodiment, the analyst identifier is specific to the device (e.g., an IP address, a device identifier number, etc.). If the security related data is anonymized, the analyst device 104 may not include the analyst identifier in the security related data provided to the provider institution computing system 106. The analyst identifier may be linked in a database of the provider institution computing system to the received security-related data.

Some or all of the security related data provided from one or more analyst devices 104 to the provider institution computing system at process 302 and process 306 may be anonymized. For example, as shown, the GUI 350 of the analyst application 132 may also include an "anonymize" field. The analyst may use this field to indicate that he or she does not want to be identified as providing the security related data. During typical operation, the transmitted security related data is tied to an analyst identifier. When the anonymization is desired, the analyst may provide an instruction via the analyst application 132. At which point, the analyst application deletes the analyst identifier from the data package that is periodically transmitted to the provider institution computing system 106. But, the data package may have a unique signature or format to indicate that the security related data is associated with the analyst application 132. In this way, because the data package has the unique signature or value or is otherwise transmitted based on the analyst application, the provider institution computing system recognizes the data packet, does not discard it, and proceeds to analyze it with other received data. As another example of an anonymization process, the analyst identifier may be provided to the provider institution 106, which may then hide the analyst identifier when providing security related data to the manager device 304. In either embodiment, when the security related data is anonymized, the security related data is not tied to a specific analyst device or a specific investment team. In certain embodiments, anonymizing the security related data may be disabled for some or all of the analyst devices 104.

Figure 4:
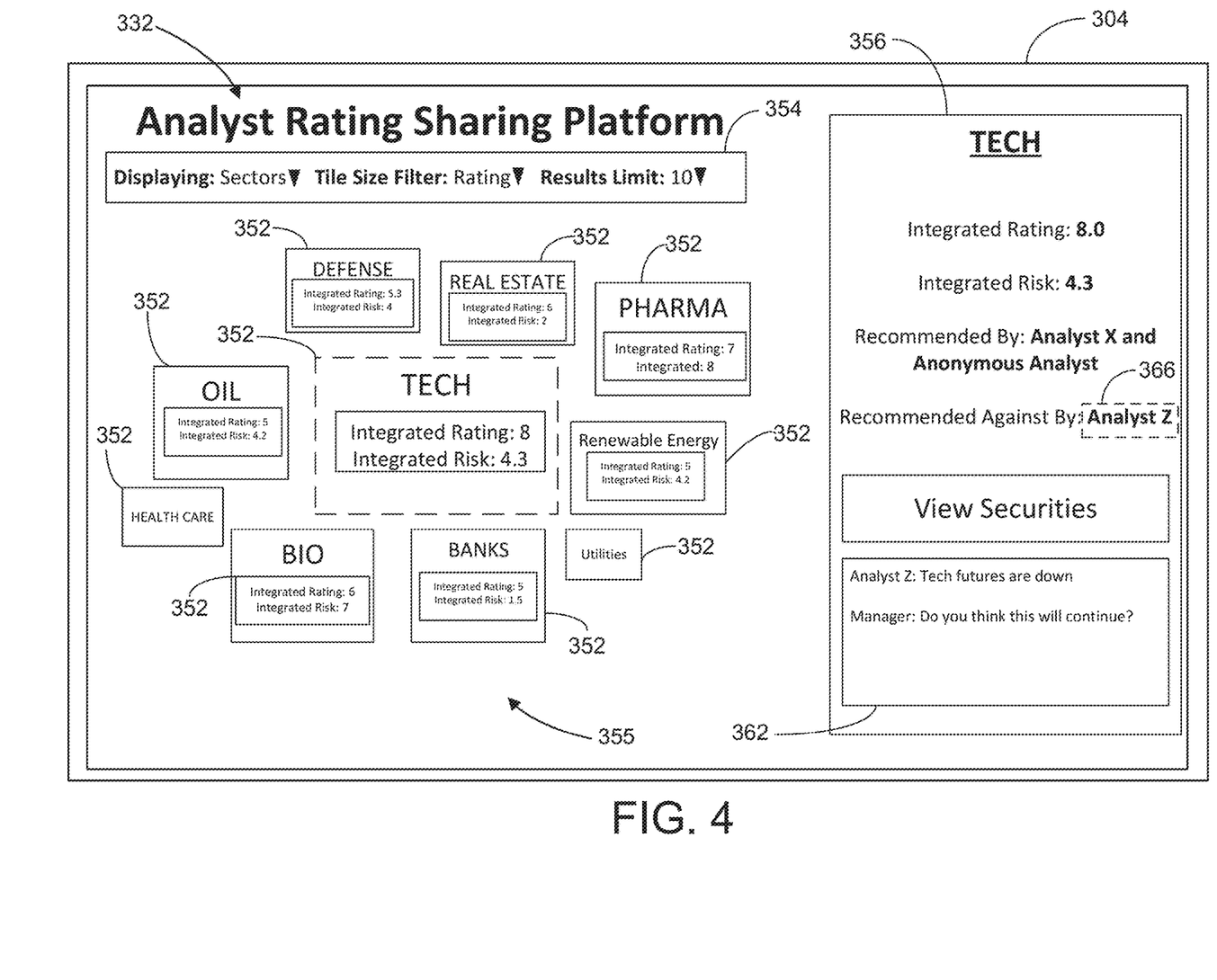
FIG. 4 is a display screen of a manager device showing a graphical user interface, according to an example embodiment.
Figure 5:
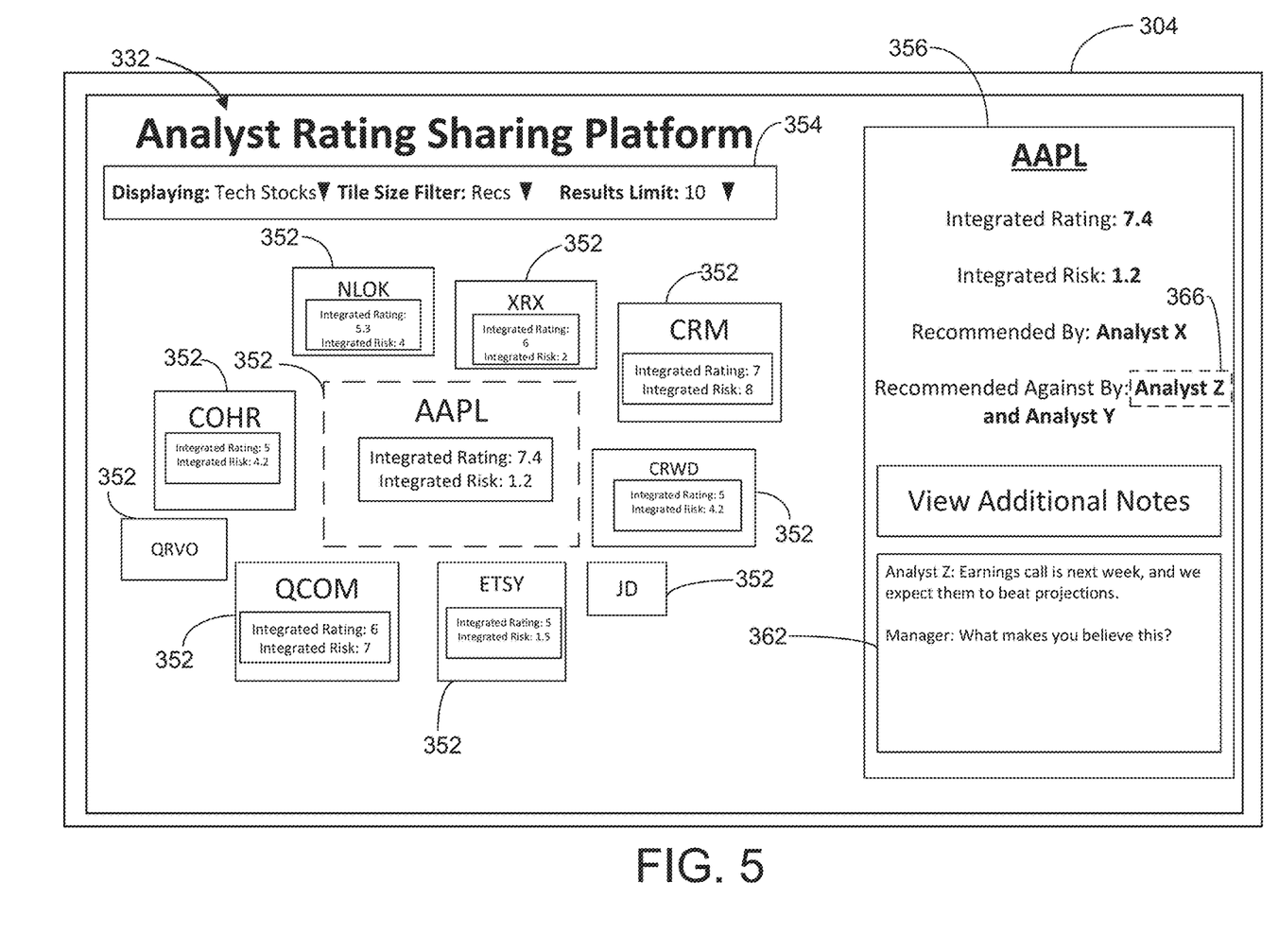
FIG. 5 is a display screen of a manager device showing a graphical user interface, according to another example embodiment.

Referring now to FIGS. 4 and 5, a display screen of the manager device 304 is shown according to two example embodiments. As shown, the display screen includes a graphical user interface (GUI) 355 as a part of the manager application 332. The manager device 304, the manager application 332, and the corresponding GUI may be utilized as a part of process 300 described above. For example, the GUI displayed in FIGS. 4 and 5 may be the GUI that is generated and provided to the manager device 304 at processes 302 and 306, respectively.

As shown, the display screen of the manager device 304 may be configured to display a plurality of tiles 352. In certain embodiments, each tile represents either a sector (e.g., FIG. 4) or a security (e.g., FIG. 5). For example, the tile may represent a sector or security for which security related data was received (e.g., by the provider institution computing system 106). The tiles 352 may further include information about the security or sector that the tile 352 represents. As shown, the tiles 352 are all rectangular shaped, however, the tiles 35 may be any shape and any mix of shapes. While the example embodiments shown in FIGS. 4 and 5 depict representing a plurality of securities and/or sectors with tiles 352, in other embodiments, the plurality of securities and/or sectors may be presented within the GUI 355 in a number of ways including, but not limited to, a list, a grid, etc.

As shown, the GUI 355 includes a filter box 354. The filter box 354 enables the portfolio manager or other person operating the manager device 304 to filter and sort the tiles 352 as desired. For example, as shown, the filter box 354 includes a "displaying" option. The portfolio manager may select the "displaying" option and choose whether the tiles 352 should represent sectors, securities, or a mix of both. Further, the filter box 354 may include a "tile size filter" option. The filter drop down or box 354 may include a "rating" option that when selected, the tile 352 that represents the sector with the highest integrated rating will be the largest, the tile 352 that represents the sector with the lowest integrated rating will be the smallest, and the remainder of the tiles 352 will be proportionately sized based on the integrated rating of the sector that the tile represents. Thus, the tile size is dynamically controlled by the application 332 based on the rating. The tile size filter may be set to any of the characteristics described herein including, but not limited to, the integrated security rating, the integrated security rating, any of the integrated security sub-ratings, any of the integrated security sub-ratings the number of analyst that have recommended the security, indices, integrated indices, etc. Alternatively, or additionally, the filter box 354 may include tile filters that allow other characteristics (e.g., shape, color, etc.) of the tiles 352 to be changed, such as a "tile color filter" option, a "tile shape filter" option, etc. For example, if the "tile color filter" option was selected, the color of the tiles may be scaled on a color gradient (e.g., from red to blue). For example, if the "tile color filter" option was set to "risk," the tile 352 that represents the security with the highest integrated risk rating may be red and the tile 352 that represents the security with the lowest integrated risk may be blue. The remaining tiles 352 are then colored in between blue and red (e.g., varying shades of purple) proportionate to the integrated risk rating of the security that the tile represents. In certain embodiments, the GUI 355 may include multiple tile characteristic filters that can be used in conjunction to provide an improved visual display to the portfolio manager (e.g., "tile size filter: rating" and "tile color filter: risk"). Further, the filter box 354 may include a results limit option that enables the portfolio manager to indicate the number of securities and/or sectors to be displayed within the GUI 355 of the manager application 332.

When the manager selects a specific sector or security, as is represented by the dashed tiles 352, in FIGS. 4 and 5, the GUI 355 of the manager application 332 may launch a summary window 356 that provides further insight into that security or sector by displaying security related data and integrated security related data. The summary window may provide additional insight into the selected sector or security including, but not limited to the integrated security rating, any of the integrated security sub-ratings, integrated risk indices, the number of analyst that have recommended the sector or security, the identity of analysts that recommended the sector or security, etc.

In certain embodiments, the manager may select the various field to view more details (e.g., which security submitted ratings, the maximum and minimum rating, when the ratings were submitted, etc.) about the information listed in the GUI 355 of the manager application 332. For example, the manager may select a specific analyst, as represented by the dashed box 366, within the manager application. For example, the specific analyst may be an analyst that recommended the security, or recommended against the security. Once selected, the manager application 332 may launch a chat box 362 to initiate a conversation with the specific analyst. For example, selecting the specific analyst may cause a chat box to be launched within the analyst application 132 of the analyst device 104 associated with the specific analyst. The manager application 332 may identify the specific analyst based on the analyst identifier (e.g., an IP address, a device identifier number, etc.) received by the manager application 332 along with the security related data that uniquely identifies the analyst device 104 and/or the respective analyst. Thus, the manager application 332 enables fast and seamless chat functionality between the portfolio manager and the analyst. Alternatively or additionally, selecting a specific analyst may launch another form of communication (e.g., phone call, email, meeting invite, etc.) such that the manager may communicate with the analyst that provided some of the analyst related data. For example, when a specific analyst is selected, the manager application 332 may retrieve account information associated with that analyst and the respective analyst device 104. The analyst may set a desired form of communication. When the analyst is selected, that form of communication is automatically initiated (phone call, email, etc.).

Further, the GUI 355 of the manager application 332 may include a "view additional notes" fields that, when selected, may cause the GUI 355 to display any additional notes and/or resources submitted by the analyst devices 104.

In certain embodiments, the portfolio manager may utilize the manager application 332 to submit alert requests for a security and/or a sector. For example, the manager may use the GUI to select a tile 352. Once selected, an option may be presented on the manager device 304 that allows the portfolio manager to submit an alert request such that the manager application receives alerts for the security or sector represented by that tile 352. The alert request may include a request or multiple requests to provide a notification to the manager application 332 in response an alert event is detected. For example, the alert request may be provided to the provider institution computing system 106, which may actively monitor received security related data to determine if an alert event is detected.

As used herein, an alert event refers to security related data being received that meets the alert criteria, as defined by the portfolio manager (or another designated operator). For example, the alert criteria may be defined by the manager using the manager application 332. The alert criteria may be defined as receiving a security rating above or below a pre-defined threshold, receiving a security sub-rating above or below a pre-defined threshold, receiving a risk index above or below a certain threshold, receiving a specific security recommendation (e.g., sell), etc. For example, if an analyst (e.g., a first analyst) submits a security rating below a predefined threshold value (e.g., via the analyst application 132), then an alert may be presented within the GUI of the manager application 332. As another example, the alert may be in response to an integrated security rating relative to a predefined threshold. Since the integrated security rating may be updated in real time or near real time, the provider institution computing system 106 and/or the manager application 332 may actively updated the integrate security rating as additional security ratings are received and integrated values generated. If the provider institution computing system 106 and/or the manager application 332 determines the integrated security rating to be below the predefined threshold, then an alert may be presented within the GUI of the manager application 332.

Upon detecting an alert event, the provider institution computing system 106 may provide an alert to the manager application 332. For example, if the manager defines the alert criteria as receiving a security rating for a specific security below a specific value, and the provider institution computing system 106 receives a security rating for the specific security below the specific value, the provider institution computing system 106 may provide an alert to the manager device 304. The manager application 332 may then generate an alert within the GUI displayed on the manager device 304. The alert may be presented within the GUI as a pop-up alert that indicates which alert criteria were met. Further, the alert may be presented within the tile 352 of the respective security or sector. In certain embodiments the alert may change the color, shape, or size of the tile 352. For example, for each rile 352 that represents a security for which an alert is provided, the tile may change to a different color (e.g., red) to indicate that there is an alert for that security. In certain embodiments, detecting an alert event may cause a meeting to be set up between the portfolio manager and one or more analysts. For example, during the application registration process, the provider institution computing system 106 may granted access to the calendar applications on the analyst and manager devices. In turn, the provider institution computing system 106 may access the portfolio manager's calendar and the one or more analyst's calendar to determine a time when the portfolio manager and the one or more analysts are available. Upon determining a suitable time, a calendar invite may be generated and provided to the analyst device(s) 104 and the manager device 304 from the provider institution computing system 106. Beneficially, changes in security views and recommendations may be observed in real or near real time such that pertinent parties (PMs and analysts) can view the changes and appropriately adjust their investment strategy, if needed.

It should be understood that no claim element herein is to be construed under the provisions of 35 U.S.C. § 112(f), unless the element is expressly recited using the phrase "means for."

As used herein, the term "circuit" may include hardware configured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be configured to perform or otherwise execute certain operations independent of one or more co-processors. In other example embodiments, two or more processors may be coupled via a bus to enable independent, parallel, pipelined, or multi-threaded instruction execution. Each processor may be implemented as one or more processors, application specific integrated circuits (ASICs), field programmable gate arrays (FPGAs), digital signal processors (DSPs), or other suitable electronic data processing components configured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include physical currencies, non-physical currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method processes, it is understood that the order of these processes may differ from what is depicted. For example, two or more processes may be performed concurrently or with partial concurrence. Also, some method processes that are performed as discrete processes may be combined, processes being performed as a combined process may be separated into discrete processes, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching processes, correlation processes, comparison processes and decision processes.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
    a network interface circuit configured to facilitate data transmission over a network; and
    a processing circuit comprising one or more processors coupled to non-transitory memory, wherein the processing circuit is configured to:
        provide a plurality of analyst applications to a plurality of analyst computing devices associated with a plurality of analysts, wherein each analyst application is configured to display a plurality of security related data fields;
        receive security related data associated with a plurality of securities from the plurality of analyst applications of the plurality of analyst computing devices via the security related data fields, wherein the security related data includes security ratings and indices;
        integrate the security related data to (i) generate a plurality of integrated security ratings based on the security ratings and (ii) generate a plurality of integrated indices based on the indices;
        provide a graphical user interface including the integrated security related data to a manager device, the graphical user interface configured to display a plurality of tiles and alter a size of a tile of the plurality of tiles in response to a tile size filter being selected on the graphical user interface, wherein each tile represents a specific security from the plurality of securities and includes at least one of an integrated security rating of the plurality of integrated security ratings or an integrated index of the plurality of integrated indices for the specific security, and wherein the size of each tile of the plurality of tiles is proportionate to a value assigned to each security;
        receive, from the manager device, an alert request comprising an alert criteria associated with a security of the plurality of securities;
        monitor, from the plurality of analyst applications, additional security related data; and
        in response to determining the additional security related data satisfies the alert criteria, actively update the graphical user interface to comprise an alert associated with the security of the plurality of securities.

2. The system of claim 1, wherein the tile size filter includes at least one of an integrated security rating filter or an integrated security sub-rating filter.

3. The system of claim 1, wherein the graphical user interface is further configured to display a specific security summary window associated with each specific security in response to the tile associated with each specific security being selected.

4. The system of claim 3, wherein each specific security summary window is configured to display an identity of an analyst associated with an analyst computing device that provided the security related data regarding the specific security.

5. The system of claim 4, wherein the graphical user interface is configured to generate a chat window in response to the identity of the analyst being selected, wherein the chat window is configured to receive a message.

6. The system of claim 5, wherein the processing circuit is further configured to provide the message to the analyst computing device that provided the security related data regarding the specific security in response to receiving the message in the chat window.

7. The system of claim 1, wherein the alert criteria includes at least one of the integrated security rating being below a pre-determined threshold, an integrated security sub-rating being below a pre-determined threshold, and an integrated risk index being below a pre-determined threshold.

8. A computing device, comprising:
a network interface circuit configured to enable data transmission over a network; and
a processing circuit coupled to the network interface circuit, the processing circuit comprising one or more processors coupled to non-transitory memory, wherein the processing circuit is configured to:
- launch a graphical user interface configured to display a plurality of tiles and alter a size of a tile of the plurality of tiles in response to a tile size filter being selected on the graphical user interface, wherein each tile represents a specific security or industry and includes at least one of an integrated security rating or an integrated index for the specific security or industry, and wherein the size of each tile of the plurality of tiles is proportionate to a value assigned to each security;
- receive a user input selecting a specific tile on the graphical user interface; and
- generate and provide a security summary window in the graphical user interface in response to receiving the user input, the security summary window displaying at least one of the integrated security rating or an integrated security sub-rating and an identity of an analyst associated with an analyst computing device that provided security-related data, wherein the security summary window is provided alongside a currently viewed research resource;
- receive, from a manager device, an alert request comprising an alert criteria associated with a security of the plurality of securities;
- monitor, from a plurality of analyst applications, additional security related data; and
- in response to determining the additional security related data satisfies the alert criteria, actively update the graphical user interface to comprise an alert associated with the security of the plurality of securities.

9. The computing device of claim 8, wherein the security summary window identifies one or more research resources relating to the specific security, wherein the one or more research resources are received from the analyst computing device.

10. The computing device of claim 9, wherein the security summary window is configured to display the identity of the analyst associated with the analyst computing device that recommended the specific security.

11. The computing device of claim 10, wherein the graphical user interface is configured to generate a chat window in response to the identity of the analyst being selected, wherein the chat window is configured to receive a message.

12. The computing device of claim 11, wherein the processing circuit is further configured to provide the message to the analyst computing device that recommended the specific security in response to receiving the message in the chat window.

13. A method comprising:
- providing, by a provider institution computing system, a plurality of analyst applications to a plurality of analyst computing devices associated with a plurality of analysts, wherein each analyst application is configured to display a plurality of security related data fields;
- receiving, by the provider institution computing system, security related data associated with a plurality of securities from the plurality of analyst computing devices, wherein the security related data includes security ratings and indices;
- integrating, by the provider institution computing system, the security related data from the plurality of analyst computing devices to generate a plurality of integrated security ratings based on the security ratings and a plurality of integrated indices based on the indices;
- generating, by the provider institution computing system, a graphical user interface configured to display a plurality of tiles, wherein each tile represents a specific security from the plurality of securities and includes at least one of an integrated security rating or an integrated index for the specific security;
- providing, by the provider institution computing system, the graphical user interface to a manager computing device such that the plurality of tiles is displayed on the manager computing device and alter a size of a tile of the plurality of tiles in response to a tile size filter being selected on the graphical user interface;
- receiving, by the provider institution computing system from the manager computing device, an alert request comprising an alert criteria associated with a security of the plurality of securities;
- monitoring, by the provider institution computing system from the plurality of analyst applications, additional security related data; and
- in response to determining the additional security related data satisfies the alert criteria, actively updating, by the provider institution computing system, the graphical user interface to comprise an alert associated with the security of the plurality of securities.

* * * * *